United States Patent
Kim et al.

(10) Patent No.: US 12,548,118 B2
(45) Date of Patent: Feb. 10, 2026

(54) METHOD AND APPARATUS FOR ACQUIRING IMAGE USING MULTISPECTRAL SENSOR

(71) Applicants: SAMSUNG ELECTRONICS CO., LTD., Suwon-si (KR); UNIST(ULSAN NATIONAL INSTITUTE OF SCIENCE AND TECHNOLOGY), Ulsan (KR)

(72) Inventors: Woo-Shik Kim, Suwon-si (KR); Youngshin Kwak, Ulsan (KR); Jisu Ohk, Ulsan (KR); Hyesun Han, Ulsan (KR)

(73) Assignees: SAMSUNG ELECTRONICS CO., LTD., Suwon-si (KR); UNIST (ULSAN NATIONAL INSTITUTE OF SCIENCE AND TECHNOLOGY), Ulsan (KR)

( * ) Notice: Subject to any disclaimer, the term of this patent is extended or adjusted under 35 U.S.C. 154(b) by 540 days.

(21) Appl. No.: 18/100,060

(22) Filed: Jan. 23, 2023

(65) Prior Publication Data
US 2023/0325995 A1  Oct. 12, 2023

(30) Foreign Application Priority Data

Apr. 8, 2022  (KR) .................. 10-2022-0044076

(51) Int. Cl.
*G06T 5/50* (2006.01)
*G06T 3/4015* (2024.01)
(Continued)

(52) U.S. Cl.
CPC .............. *G06T 5/50* (2013.01); *G06T 3/4015* (2013.01); *H04N 9/67* (2013.01); *H04N 23/11* (2023.01);
(Continued)

(58) Field of Classification Search
CPC ................... G06T 5/50; G06T 3/4015; G06T 2207/10024; G06T 2207/10036;
(Continued)

(56) References Cited

U.S. PATENT DOCUMENTS

| | | |
|---|---|---|
| 10,461,106 B2 | 10/2019 | Ozawa |
| 2008/0283729 A1 | 11/2008 | Hosaka |

(Continued)

FOREIGN PATENT DOCUMENTS

| | | |
|---|---|---|
| CN | 104113743 B | 9/2017 |
| CN | 113365034 A | 9/2021 |

(Continued)

OTHER PUBLICATIONS

European Extended Search Report issued Aug. 14, 2023 issued by the European Patent Office for EP Patent Application No. 23155580.6.

(Continued)

*Primary Examiner* — Phuoc Tran
(74) *Attorney, Agent, or Firm* — Sughrue Mion, PLLC

(57) ABSTRACT

A method of acquiring an image includes: acquiring channel signals corresponding to more than four channels from a multispectral sensor; determining a cumulative infrared signal included in all of the channel signals by synthesizing the infrared components of the channel signals; calculating an infrared component of each channel, based on the cumulative infrared signal and individual characteristics of the channels; and acquiring corrected channel signals by removing the infrared component from each of the channel signals.

18 Claims, 13 Drawing Sheets

(51) Int. Cl.
*H04N 9/67* (2023.01)
*H04N 23/11* (2023.01)

(52) U.S. Cl.
CPC ............ *G06T 2207/10024* (2013.01); *G06T 2207/10036* (2013.01); *G06T 2207/20084* (2013.01)

(58) Field of Classification Search
CPC ............ G06T 2207/20084; H04N 9/67; H04N 23/11; H04N 25/131; G01J 2003/1213; G01J 3/28; G01J 3/2803; G01J 3/2823; G01J 1/029; G01J 3/0294; G01J 3/0297; G01J 3/46; G01J 2003/2826; G01J 2003/2843; G06N 3/044; G06N 3/0464
See application file for complete search history.

(56) References Cited

U.S. PATENT DOCUMENTS

| | | |
|---|---|---|
| 2014/0307098 A1 | 10/2014 | Kang et al. |
| 2015/0219492 A1* | 8/2015 | Glover .................... G01J 3/505 702/196 |
| 2017/0359487 A1 | 12/2017 | Andersen |
| 2020/0304732 A1* | 9/2020 | Finlayson ............ H04N 25/133 |
| 2020/0343286 A1* | 10/2020 | Ozawa .................. H10F 39/184 |
| 2024/0020809 A1* | 1/2024 | Shi ....................... G06V 10/143 |

FOREIGN PATENT DOCUMENTS

| | | |
|---|---|---|
| CN | 113566966 A | 10/2021 |
| EP | 2700920 A1 | 2/2014 |
| JP | 2007-043427 A | 2/2007 |
| JP | 2008-288629 A | 11/2008 |
| JP | 2017-139286 A | 8/2017 |
| JP | 2018-503329 A | 2/2018 |

OTHER PUBLICATIONS

Communication dated Jul. 8, 2024, issued by the Korean Intellectual Property Office in Korean Patent Application No. 10-2022-0044076.

* cited by examiner

METHOD AND APPARATUS FOR ACQUIRING IMAGE USING MULTISPECTRAL SENSOR

CROSS-REFERENCE TO RELATED APPLICATION

This application is based on and claims priority under 35 U.S.C. § 119 to Korean Patent Application No. 10-2022-0044076, filed on Apr. 8, 2022, in the Korean Intellectual Property Office, the disclosure of which is incorporated by reference herein in its entirety.

BACKGROUND

1. Field

Methods and apparatus consistent with this disclosure relate to acquiring an image using a multispectral sensor.

2. Description of Related Art

Human eyes can visually perceive light of the visible ray band but cannot perceive light outside the visible ray band. An image sensor is often implemented to function as human eyes. However, most of the images sensors actually generate signals by absorbing not only light of the visible ray band but also light in the infrared band. For example, a multispectral sensor may be capable of sensing electromagnetic radiation in more wavelength bands compared to a red-green-blue (RGB) sensor, and may sense light of both the visible ray band and the infrared band.

However, in some cases, due to the effects of light of the infrared band, errors may occur in an image generated by the image sensor or colors may not be expressed accurately. Accordingly, technology to restore signal information by removing an infrared component from signals acquired by the image sensor may be required.

SUMMARY

Provided are methods and apparatuses for acquiring an image by using a multispectral sensor. Technical objects of embodiments of the present disclosure are not limited to the foregoing, and other technical objects may be inferred from described embodiments.

Additional aspects will be set forth, in part, in the following and, in part, will be apparent from the description, or may be learned by practice of presented embodiments.

According to an embodiment, a method may include acquiring an image by using a multispectral sensor, including: acquiring channel signals corresponding respectively to a plurality of channels from the multispectral sensor, wherein the plurality of channels comprises more than four channels; determining a cumulative infrared signal included in all of the plurality of channels by synthesizing infrared components of the channel signals acquired from all of the plurality of channels; determining an infrared component of each channel of the plurality of channels, based on the cumulative infrared signal and individual characteristics of the channels; and acquiring corrected channel signals by removing the infrared component from each of the channel signals of the plurality of channels.

An embodiment may include acquiring of the channel signals including selecting more than four channels physically provided at the multispectral sensor and acquiring the channel signals from the selected channels.

An embodiment may include acquiring of the channel signals including synthesizing or interpolating channel signals from four or more channels physically provided at the multispectral sensor to acquire a number of channel signals, which is more or less than the a number of channel signals physically provided at the multispectral sensor.

An embodiment may include determining the cumulative infrared signal includes synthesizing a second-order or higher-order polynomial function corresponding to each of the channel signals as a variable.

An embodiment may include determining the infrared component of each channel includes calculating the infrared component of each channel by applying, to the cumulative infrared signal, a weight considering the individual characteristics of each channel.

An embodiment may include the infrared component of each channel corresponding to a signal intensity increased when a signal of an infrared band is included in each channel of the plurality of channels, compared to a case where only a signal of a visible ray band is included in each channel of the plurality of channels.

An embodiment may include generating a red-green-blue (RGB) image by applying a color conversion matrix to the corrected channel signals.

An embodiment may include optimizing the color conversion matrix to minimize a color difference between a color value obtained by using the color conversion matrix and an actual color value.

An embodiment may include determining the cumulative infrared signal or determining the infrared component of each channel is determined by using a pre-trained neural network.

An embodiment may include generating an image per channel by performing demosaicing on the channel signals; and performing image processing on the image per channel.

An embodiment may include an image acquisition apparatus including: a multispectral sensor; and a processor, the processor being configured to acquire channel signals corresponding respectively to a plurality of channels from the multispectral sensor, wherein the plurality of channels includes more than four channels, determine a cumulative infrared signal included in all of the plurality of channels by synthesizing infrared components of the channel signals acquired from the plurality of channels, determine an infrared component of each channel of the plurality of channels, based on the cumulative infrared signal and individual characteristics of the channels, and acquire corrected channel signals by removing the infrared component from each of the channel signals of the plurality of channels.

An embodiment may include a processor configured to select more than four channels physically provided at the multispectral sensor and acquire the channel signals from the selected channels.

An embodiment may include a processor configured to acquire the channel signals by synthesizing or interpolating channel signals acquired from four or more channels physically provided at the multispectral sensor to acquire a number of channel signals, which is more or less than a number channels physically provided at the multi\spectral sensor.

An embodiment may include a processor configured to determine the cumulative infrared signal by synthesizing a second-order or higher-order polynomial function corresponding to each of the channel signals as a variable.

An embodiment may include a processor configured to determine the infrared component of each channel by applying, to the cumulative infrared signal, a weight considering the individual characteristics of each channel.

An embodiment may include the infrared component of each channel corresponding to a signal intensity increased when a signal of an infrared band is included in each channel of the plurality of channels, compared to a case where only a signal of a visible ray band is included in each channel of the plurality of channels.

An embodiment may include a processor configured to generate a red-green-blue (RGB) image by applying a color conversion matrix to the corrected channel signals.

An embodiment may include a processor configured to optimize the color conversion matrix to minimize a color difference between a color value obtained by using the color conversion matrix and an actual color value.

An embodiment may include a processor configured to determine the cumulative infrared signal or determine the infrared component of each channel by using a pre-trained neural network.

An embodiment may include a multispectral sensor including a photodiode; a spectral filter integrated on the photodiode; and a driver circuit configured to drive the photodiode.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
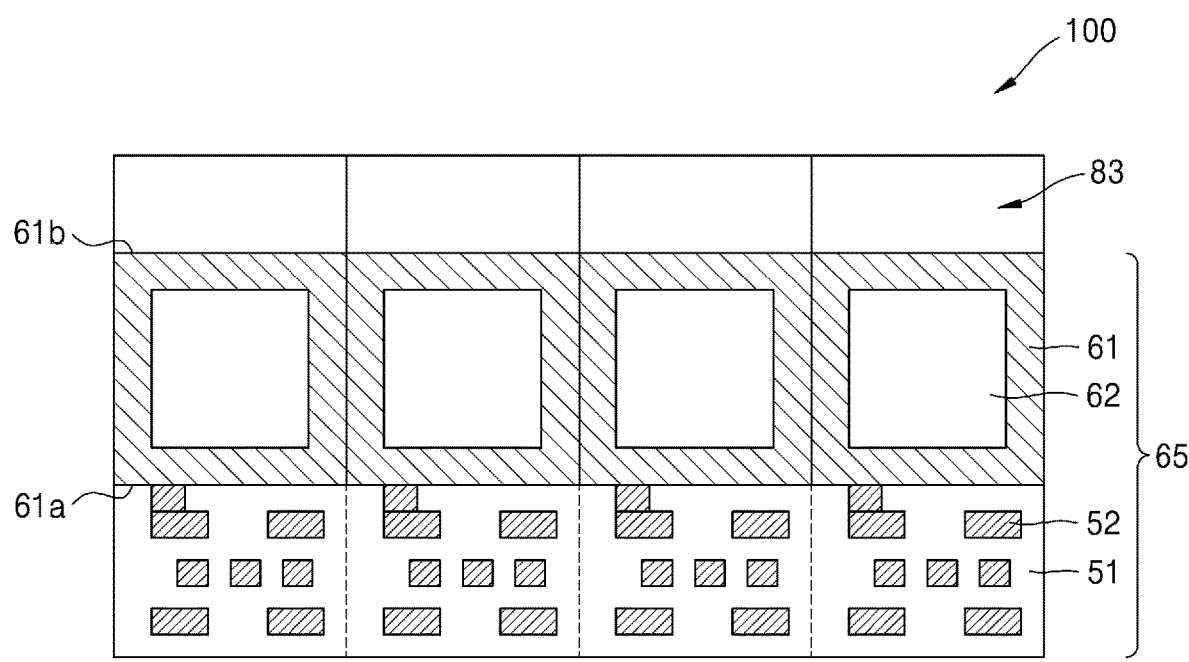
FIG. 1 is a diagram schematically illustrating a cross-section of a multispectral sensor according to an embodiment.

Reference will now be made in detail to embodiments, examples of which are illustrated in the accompanying drawings, wherein like reference numerals refer to like elements throughout. In this regard, example embodiments may have different forms and should not be construed as being limited to the descriptions set forth herein. Accordingly, example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

General terms which are currently used have been selected for use in consideration of their wide use when describing functions in embodiments. However, such terms may be changed according to an intention of a person skilled in the art, precedents, advent of new technologies, etc. Further, in certain cases, terms have been arbitrarily selected, and in such cases, meanings of the terms will be described in detail in corresponding descriptions. Accordingly, the terms used in the embodiments should be considered based on their meanings as understood by one skilled in the art, overall descriptions of embodiments and context.

In some descriptions of embodiments, when a portion is described as being connected to another portion, the portion may be connected directly to another portion, or electrically connected to another portion with an interposing portion therebetween. When a portion "includes" a component, another component may be further included, rather than excluding the existence of the other component, unless otherwise described.

The terms "comprise" or "include" used in describing embodiments should not be construed as including all components or operations described in the specification, and may be understood as not including some of the components or operations, or further including additional components or operations.

The descriptions of the following embodiments should not be construed as limiting the scope of rights, and matters that those skilled in the art can easily derive should be construed as being included in the scope of rights of described embodiments. Hereinafter, embodiments will be described in detail as an example, with reference to the attached drawings.

FIG. 1 is a diagram schematically illustrating a cross-section of a multispectral sensor according to an embodiment.

A multispectral sensor 100 illustrated in FIG. 1 may include, for example, a complementary metal oxide semiconductor (CMOS) image sensor or a charge coupled device (CCD) image sensor.

With reference to FIG. 1, the multispectral sensor 100 may include a pixel array 65 and a spectral filter 83 arranged on the pixel array 65. Here, the pixel array 65 may include a plurality of pixels arranged in a two-dimensional (2D) manner, and the spectral filter 83 may include a plurality of resonators arranged to respectively correspond to the plurality of pixels. FIG. 1 illustrates an example in which the pixel array 65 includes four pixels and the spectral filter 83 includes four resonators.

Each pixel of the pixel array 65 may include a photodiode 62, which is a photoelectric transformation element, and a driver circuit 52 configured to drive the photodiode 62. The photodiode 62 may be buried in a semiconductor substrate 61. For example, a silicon substrate may be used as the semiconductor substrate 61. However, the present disclosure is not limited thereto. A wiring layer 51 may be provided on a lower surface 61a of the semiconductor substrate 61, and the driver circuit 52, such as a metal oxide semiconductor field effect transistor (MOSFET), etc. may be provided in the wiring layer 51.

The spectral filter 83 including the plurality of resonators may be provided on an upper surface 61b of the semiconductor substrate 61. Each resonator may be provided to transmit light of a particular desired wavelength range. Each resonator may include reflection layers arranged apart from each other and cavities provided between the reflection layers. Each of the reflection layers may include, for example, a metal reflection layer or a Bragg reflection layer. Each cavity may be provided to cause resonance of light of a particular desired wavelength range.

The spectral filter 83 may include one or more functional layers improving the transmittance of light passing through the spectral filter 83 and incident towards to the photodiode 62. The functional layer may include a dielectric layer or a dielectric pattern with adjusted refractive index. Moreover, the functional layer may include, for example, an anti-reflection layer, a condenser lens, a color filter, a short-wavelength absorption filter, or a long-wavelength cutoff filter, etc. However, other components or elements for modifying light and/or adjusting wavelength may also be used.

Figure 2:
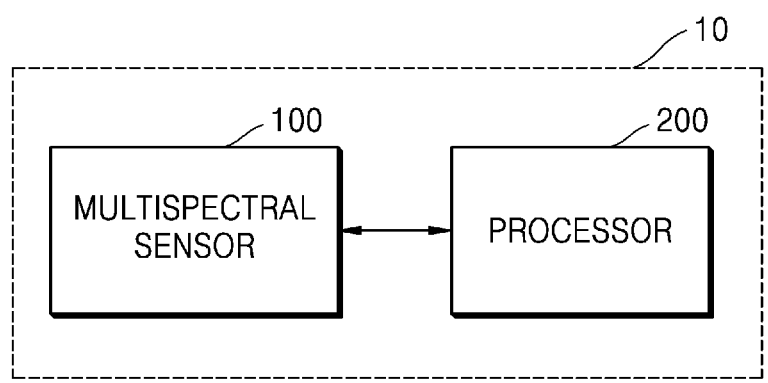
FIG. 2 is a block diagram illustrating a schematic structure of an image acquisition apparatus according to an embodiment.

FIG. 2 is a block diagram illustrating a schematic structure of an image acquisition apparatus according to an embodiment.

Figure 3:
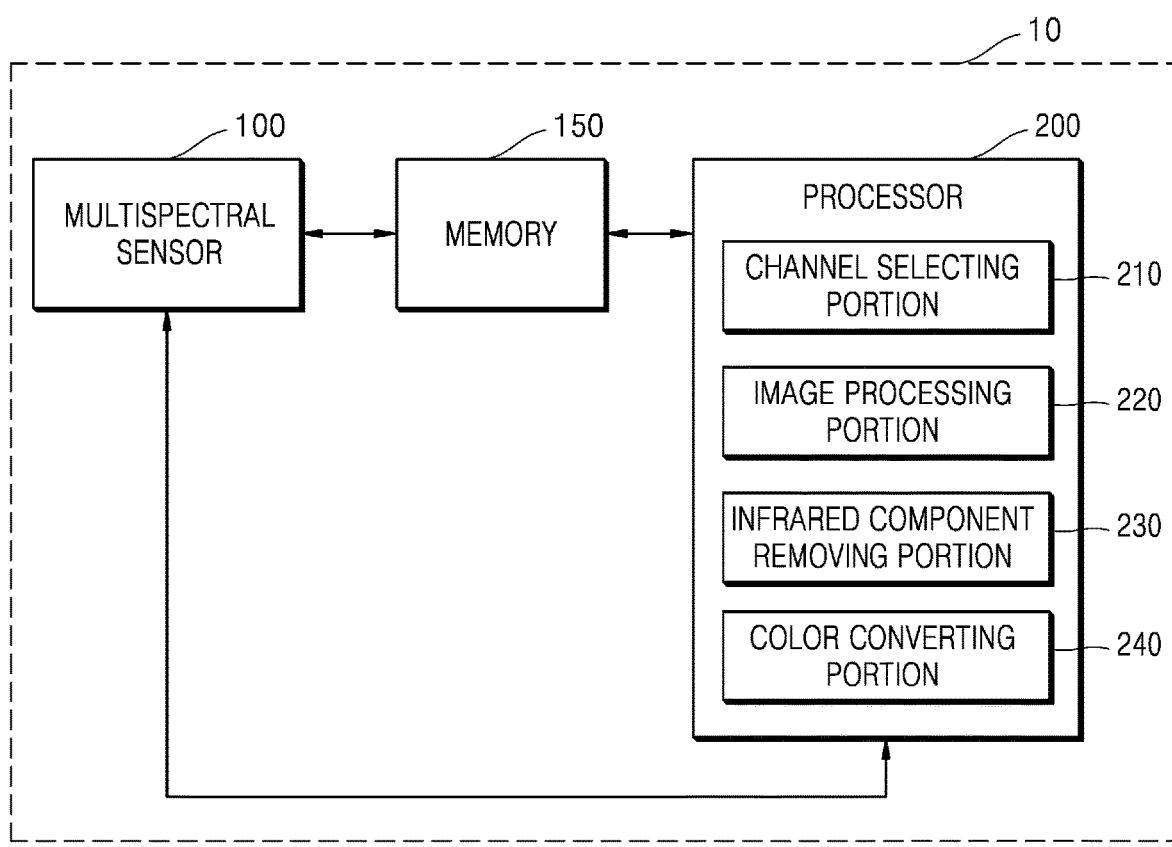
FIG. 3 is a block diagram of the image acquisition apparatus of FIG. 2.

With reference to FIG. 2, an image acquisition apparatus 10 may include the multispectral sensor 100 and a processor 200. The image acquisition apparatus 10 of FIG. 2 shows the components related to example embodiments. Accordingly, it is apparent to a person skilled in the art that the image acquisition apparatus 10 may further include other components in addition to the components shown in FIG. 2. For example, the image acquisition apparatus 10 may further include a memory 150, as illustrated in FIG. 3, and may also further include other components in addition to the memory 150.

Figure 4:
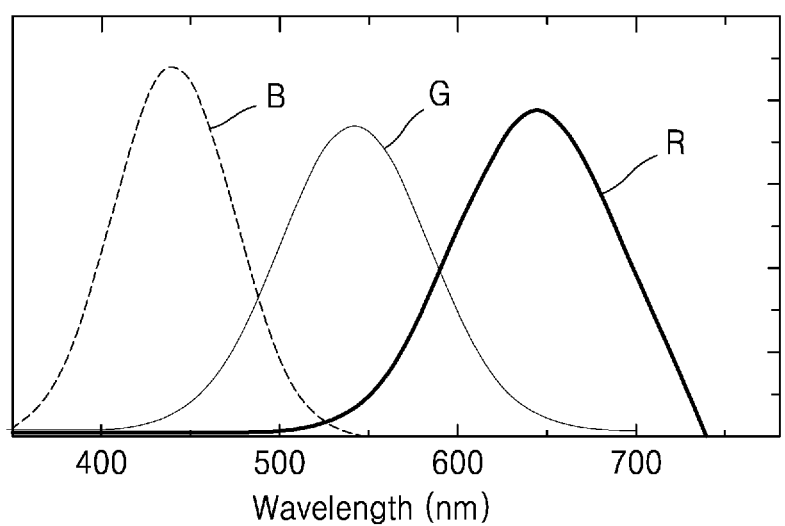
FIG. 4 is a diagram showing wavelength spectrums of a red-green-blue (RGB) sensor.
Figure 5:
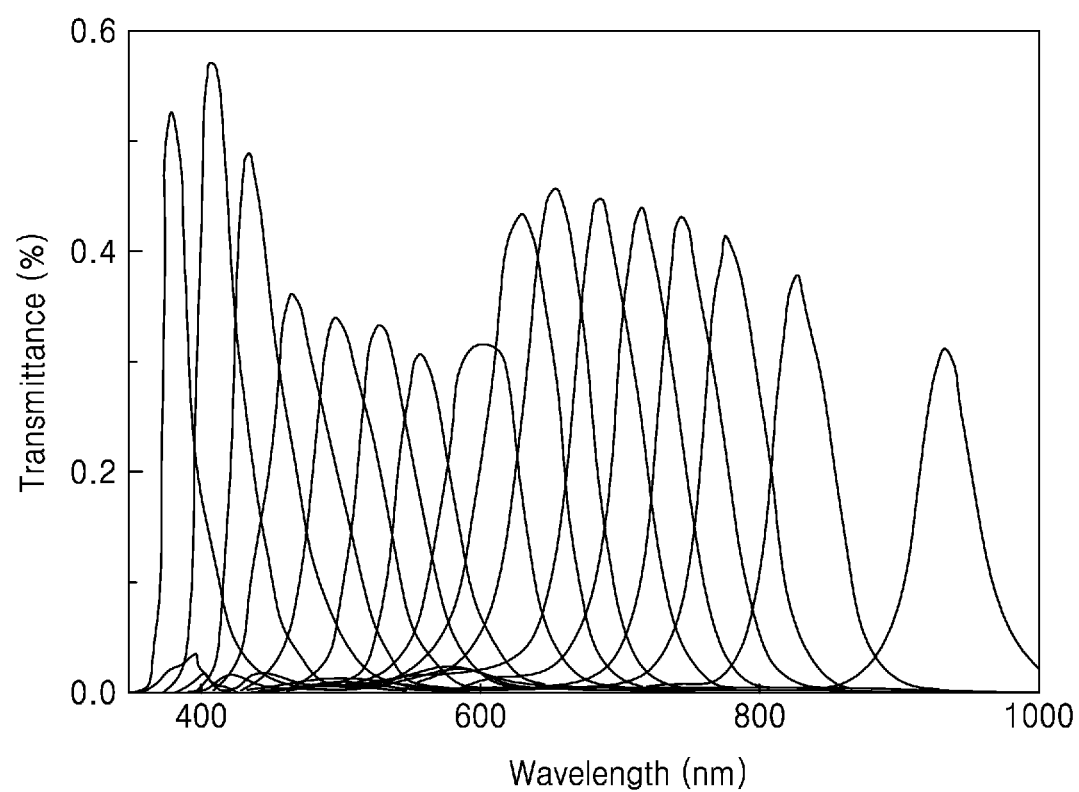
FIGS. 5 and 6 are diagrams showing wavelength spectrums of a multispectral sensor according to embodiments.
Figure 6:
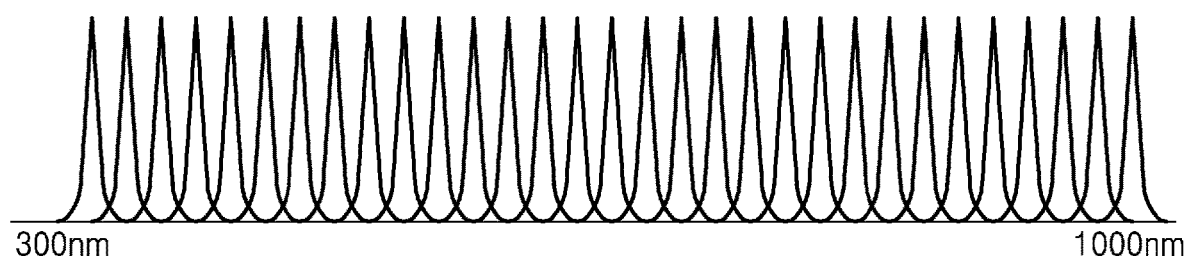

The multispectral sensor 100 may refer to a sensor configured to sense light having various types of wavelength bands. For example, the multispectral sensor 100 may sense light of more wavelength bands than a red-green-blue (RGB) sensor may sense. With reference to FIG. 4, an RGB sensor may include an R channel, a G channel, and a B channel, and may sense light of wavelength bands corresponding to each of the three channels. In contrast, the multispectral sensor 100 may include 16 channels or 31 channels, as illustrated in FIGS. 5 and 6 by example. However, the present disclosure is not limited thereto, and the multispectral sensor 100 may include any number of channels as long as the multispectral sensor 100 includes more than four channels.

The multispectral sensor 100 may adjust a center wavelength, a bandwidth, and a transmission amount of light absorbed through each channel so that each channel may sense light of a desired band. For example, a bandwidth of each channel of the multispectral sensor 100 may be narrower than a bandwidth of the R channel, the G channel, and the B channel. Moreover, a whole bandwidth obtained by summing all bandwidths of all channels of the multispectral sensor 100 may include a whole bandwidth of the RGB sensor, and may be wider than the whole bandwidth of the RGB sensor. An image acquired by the multispectral sensor 100 may be a multispectral or hyperspectral image. The multispectral sensor 100 may obtain an image by dividing a relatively wide wavelength band including a visible ray band, an infrared band, and an ultraviolet band into a plurality of channels.

The processor 200 may control all operations of the image acquisition apparatus 10. The processor 200 may include one processor core (a single-core) or a plurality of processor cores (a multi-core). The processor 200 may process or execute programs and/or data stored in a memory. For example, the processor 200 may control functions of the image acquisition apparatus 10 by executing the programs stored in the memory.

The processor 200 may obtain channel signals corresponding to more than four channels from the multispectral sensor 100, and accurately predict a spectrum of an infrared component by considering individual characteristics of each the plurality of channels. The processor 200 may generate an image having an accurate color by effectively removing an infrared component corresponding to each channel signal, from each channel signal obtained from the multispectral sensor 100.

The image acquisition apparatus 10 does not use an infrared cutoff filter and thus may sense all of the visible ray band and the infrared band. Furthermore, the image acquisition apparatus 10 may also effectively remove the infrared component from the visible ray band when necessary. Accordingly, the image acquisition apparatus 10 according to the present disclosure may not only generate an RGB image having accurate colors but also be used properly in various applications where an infrared component is processed. Hereinafter, the image acquisition apparatus 10 is described in more detail with reference to FIG. 3.

FIG. 3 is a detail block diagram of the image acquisition apparatus 10 of FIG. 2.

With reference to FIG. 3, the image acquisition apparatus 10 may further include the memory 150 in addition to the multispectral sensor 100 and a processor 200. Moreover, the processor 200 may include a channel selecting portion 210, an image processing portion 220, an infrared component removing portion 230, and a color converting portion 240. For convenience in explanation, the channel selecting portion 210, the image processing portion 220, the infrared component removing portion 230, and the color converting portion 240 are distinguished from each other according to an operation of the processor 200. However, such separate description does not necessarily mean physical separation of these units. The aforementioned units may be a combination of hardware and/or software included in the processor 200, and their configurations be physically the same as or different from each other.

The memory 150 may refer to hardware storing various types of data processed by the image acquisition apparatus 10. For example, the memory 150 may store an image (or signal) obtained from the multispectral sensor 100. The memory 150 may be a line memory sequentially storing images on a line basis, and may be a frame buffer storing an entire image. Furthermore, the memory 150 may store applications, drivers, etc. to be run by the image acquisition apparatus 10. The memory 150 may include random access memory (RAM), such as dynamic random access memory (DRAM) and static random access memory (SRAM), read-only memory (ROM), electrically erasable programmable read-only memory (EEPROM), a CD-ROM, a Blu-ray disc, or other optical disc storages, a hard disk drive (HDD), a solid state drive (SSD), or flash memory. However, the present disclosure is not limited thereto.

The memory 150 may be arranged outside the multispectral sensor 100 or may be integrated inside the multispectral sensor 100. When the memory 150 is integrated inside the multispectral sensor 100, the memory 150 may be integrated along with a circuit portion (e.g., the wiring layer 51 and/or driver circuit 52 described with reference to FIG. 1.) A pixel portion (e.g., the semiconductor substrate 61 and/or the photodiode 62 described with reference to FIG. 1) and the remaining portion (e.g., the circuit portion and the memory 150) may respectively be a stack, and a total of two stacks may be integrated. In this case, the multispectral sensor 100 may include a single chip including two stacks. However, the present disclosure is not limited thereto, and the multispectral sensor 100 may be implemented as three stacks having the pixel portion, the circuit portion, and the memory 150.

The circuit portion included in the multispectral sensor 100 may be the same as or different from the processor 200. When the circuit portion included in the multispectral sensor 100 is identical to the processor 200, the image acquisition apparatus 10 may be the multispectral sensor 100 implemented as an on-chip element. Furthermore, even when the circuit portion included in the multispectral sensor 100 is different from the processor 200, if the processor 200 is arranged inside the multispectral sensor 100, the image acquisition apparatus 10 may be implemented as an on-chip element. However, the present disclosure is not limited thereto, and the processor 200 may be separately arranged outside the multispectral sensor 100.

The channel selecting portion 210 may obtain channel signals corresponding to more than four channels from the multispectral sensor 100. The channel selecting portion 210 may select at least some of the channels physically provided at the multispectral sensor 100 and acquire the channel signals from the selected channels. For example, the channel selecting portion 210 may obtain channel signals from all of the channels physically provided at the multispectral sensor 100. Moreover, the channel selecting portion 210 may obtain channel signals by selecting only some of the channels physically provided at the multispectral sensor 100.

The channel selecting portion 210 may acquire an increased or reduced number of channel signals, which are more or less than a number of channel signals, by synthesizing or interpolating channel signals acquired from the channels physically provided at the multispectral sensor 100. For example, the channel selecting portion 210 may obtain a reduced number of channel signals, which is less than a number of channels provided by the multispectral sensor 100, by performing binning on the pixels or channels of the multispectral sensor 100. Moreover, the channel selecting portion 210 may obtain an increased number of channel signals, which is more than a number of channels provided by the multispectral sensor 100, by generating new channel signals through interpolation of the channel signals from the multispectral sensor 100.

When the number of acquired channel signals is decreased, each of the channel signals may be of a relatively wider band than when the number of channel signals is not reduced. In this situation, the sensitivity of the signals may be increased, and the noise may be reduced. On the contrary, when the number of acquired channel signals is increased, the sensitivity of each channel signal may be slightly decreased, but a more accurate image may be obtained based on an increase in the number of channel signals. As such, as there is a trade-off according to an increase or decrease of the acquired channel signals. The channel selecting portion 210 may obtain a proper number of channel signals according to an application for which the image will be used.

The image processing portion 220 may perform basic image processing before or after an image or a signal obtained by the multispectral sensor 100 is stored in the memory 150. The basic image processing may include bad pixel correction, fixed pattern noise correction, crosstalk reduction, remosaicing, demosaicing, false color reduction, denoising, chromatic aberration correction, etc.

The image processing portion 220 may perform at least part of the basic image processing before or after the operation of the infrared component removing portion 230 is performed. For example, the image processing portion 220 may perform bad pixel correction, etc. before the operation of the infrared component removing portion 230 is performed, and perform demosaicing, etc. after the operation of the infrared component removing portion 230 is performed. The image processing portion 220 may generate an image per channel by performing demosaicing on the channel signals, and perform image processing on the image per channel. Hereinafter, the process of demosaicing performed by the image processing portion 220 is described with reference to FIG. 7.

Figure 7:
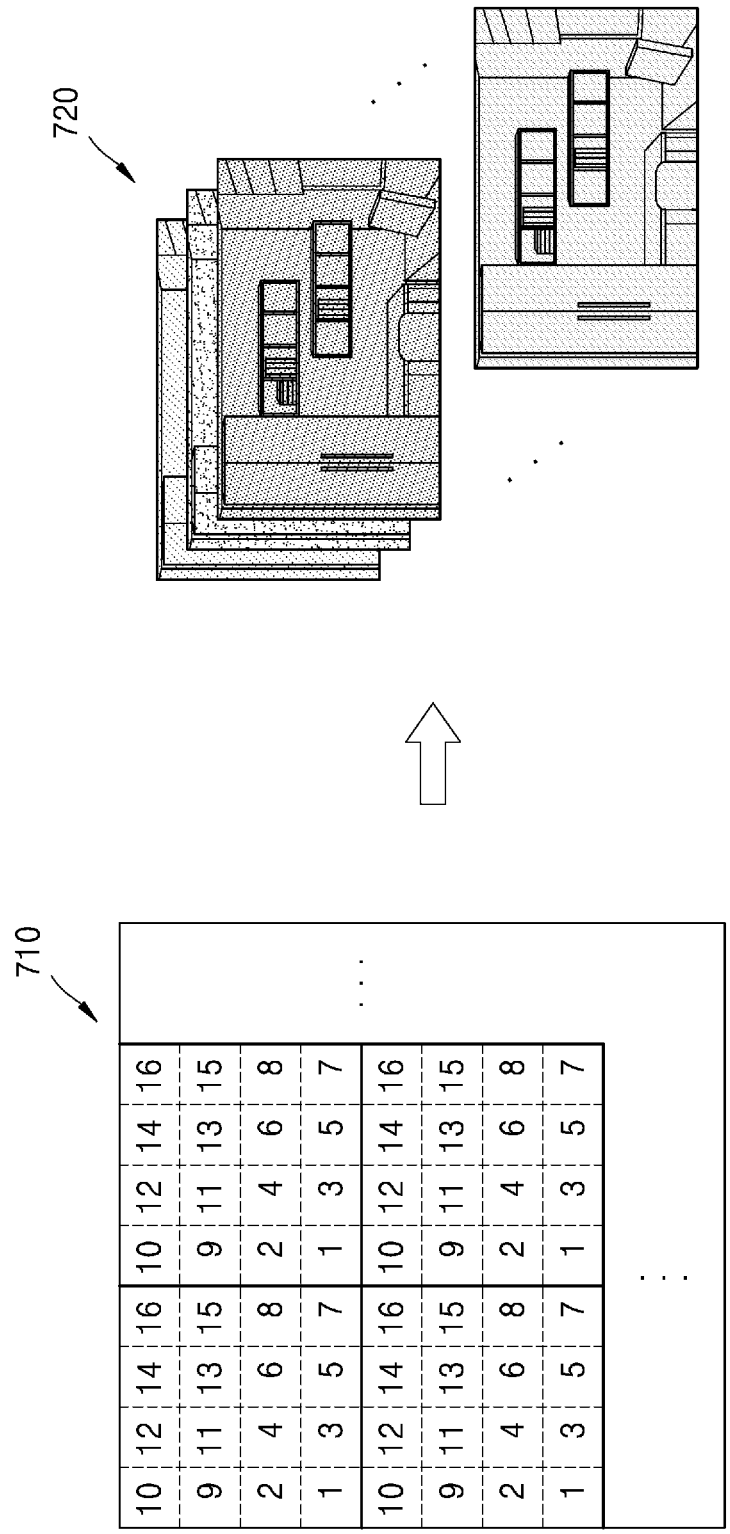
FIG. 7 is a diagram for explaining a process of generating an image per channel based on signals acquired from a plurality of channels of a multispectral sensor according to an embodiment.

FIG. 7 is a diagram for explaining a process of generating an image per channel based on signals acquired from a plurality of channels of a multispectral sensor according to an embodiment.

FIG. 7 illustrates a raw image 710 obtained from the multispectral sensor and an image per channel 720 after the demosaicing. In the raw image 710, one small quadrangle represents one pixel, and the number in the quadrangle represents a channel number. As understood from the channel numbers illustrated, FIG. 7 represents an image obtained from the multispectral sensor including 16 channels. Although the raw image 710 includes all pixels of different channels, as pixels of the same numbered channels are gathered though the demosaicing, the image per channel 720 may be generated.

Referring back to FIG. 3, the infrared component removing portion 230 may extract an infrared signal included in all channel signals by synthesizing the channel signals. For example, the infrared component removing portion 230 may generate an infrared signal based on a polynomial function of any order including each of the channel signals as a variable.

For example, an infrared signal $L_{IR}$, (as a cumulative infrared signal) may be calculated according to the following Equation 1 including N channels signals, i.e., $C_1$ to $C_N$, as variables.

$$L_{IR} = \sum_{i=1}^{N} \alpha_i \cdot C_i + \sum_{i,j=1}^{N} \alpha_{ij} \cdot C_i \cdot C_j + \ldots \quad \text{[Equation 1]}$$

In Equation 1, each of $\alpha_i$ and $\alpha_{ij}$ (i and j are natural numbers ranging from 1 to N) represents a weight applied to each channel signal to determine an appropriate weight of an infrared component of the associated channel. $\alpha_i$ and $\alpha_{ij}$ may be an experimentally decided constant, but the present disclosure is not limited thereto. In an example embodiment, N is more than 4. The first term of the right side of Equation 1 is a first-order term, and the second term is a second-order term or a cross-term. In Equation 1, terms higher than third-order terms are omitted, but they may be included when necessary.

To accurately calculate the infrared signal $L_{IR}$ based on Equation 1, at least a second-order polynomial function may be required. For example, the infrared component removing portion 230 may generate an infrared signal based on a second-order or higher-order of polynomial function including each of the channel signals as a variable. Equation 1 encompasses all possible cases including the case where i is identical to or different from j; however, Equation 1 may include the case where i is identical to j. In such a case, Equation 1 may not include a cross term between the channel signals.

The infrared component removing portion 230 may calculate an infrared component of each channel, based on the infrared signal and individual characteristics of the channels. The infrared component removing portion 230 may calculate the infrared component of each channel by applying a weight considering the individual characteristics of the channel to the infrared signal. For example, the infrared component removing portion 230 may calculate an infrared component of each channel $\Delta C_i$ according to the following Equation 2.

$$\Delta C_i = \beta_i \cdot L_{IR} \qquad \text{[Equation 2]}$$

The infrared component of each channel $\Delta C_i$ may correspond to a signal intensity increased when a signal of an infrared band is further included, compared to a case where only a signal of a visible ray band is included in each of the channel signals. $\beta_i$ may be an experimentally decided constant, but the present disclosure is not limited thereto. $\beta_i$ may be properly set considering the fact that the effect of the infrared component may vary according to channel characteristics.

The infrared component removing portion 230 may obtain corrected channel signals by removing corresponding infrared components from each of the channel signals. For example, the infrared component removing portion 230 may obtain corrected channel signals $C_{i,out}$ according to the following Equation 3.

$$C_{i,out} = C_i - \Delta C_i \qquad \text{[Equation 3]}$$

The infrared component removing portion 230 may extract an infrared signal or calculate an infrared component of each channel by using a pre-trained neural network. For example, the infrared component removing portion 230 may obtain a polynomial function of a certain order used to generate the infrared signal by using a neural network. In another example, only the weights included in the polynomial function, $\alpha_i$ and $\alpha_{ij}$, may be obtained by using the neural network. Furthermore, the infrared signal itself may be an output of the neural network.

Similarly, the infrared component removing portion 230 may obtain the infrared component of each channel itself, the weight $\beta_i$ used to calculate the infrared component of each channel, etc. by using the neural network. Moreover, the infrared component removing portion 230 may directly obtain the corrected channel signals by using the pre-trained neural network.

The neural network may have an architecture of a deep neural network (DNN) or n-layers neural networks. The DNN or n-layers neural networks may be convolutional neural networks (CNN), recurrent neural networks (RNN), deep belief networks, restricted Boltzmann machines, residual neural networks (Resnet), etc. However, the present disclosure is not limited thereto, and the neural networks may have various architectures.

The color converting portion 240 may generate an RGB image by applying a color conversion matrix to the corrected channel signals. The color converting portion 240 may convert the corrected channel signals into a CIE-XYZ color space by using a 3×N matrix Mc. For example, the color converting portion 240 may convert the corrected channel signals according to the following Equation 4.

$$\begin{bmatrix} X_{predict} \\ Y_{predict} \\ Z_{predict} \end{bmatrix} = M_C \cdot \begin{bmatrix} C_{1,out} \\ \vdots \\ C_{N,out} \end{bmatrix} \qquad \text{[Equation 4]}$$

Then, the color converting portion 240 may convert an XYZ signal into a standard RGB color space by using a determinant defined by each standard. For example, when the corrected channel signals are to be converted into a sRGB standard color space, the color converting portion 240 may obtain a sRGB signal according to the following Equation 5. In Equation 5, $M_{sRGB}$ represents a determinant defined in the sRGB standard color space.

$$\begin{bmatrix} R_s \\ G_s \\ B_s \end{bmatrix} = M_{sRGB} \cdot M_C \cdot \begin{bmatrix} C_{1,out} \\ \vdots \\ C_{N,out} \end{bmatrix} \qquad \text{[Equation 5]}$$

The color conversion matrix Mc may be obtained by a method of minimizing a color difference based on a result of measuring or photographing various test colors or a method of restoring a spectrum. For example, the color converting portion 240 may optimize the color conversion matrix so that a color difference between a color value obtained by using the color conversion matrix and an actual color value is minimized. Hereinafter, the process of optimizing the color conversion matrix is described with reference to FIG. 8.

Figure 8:
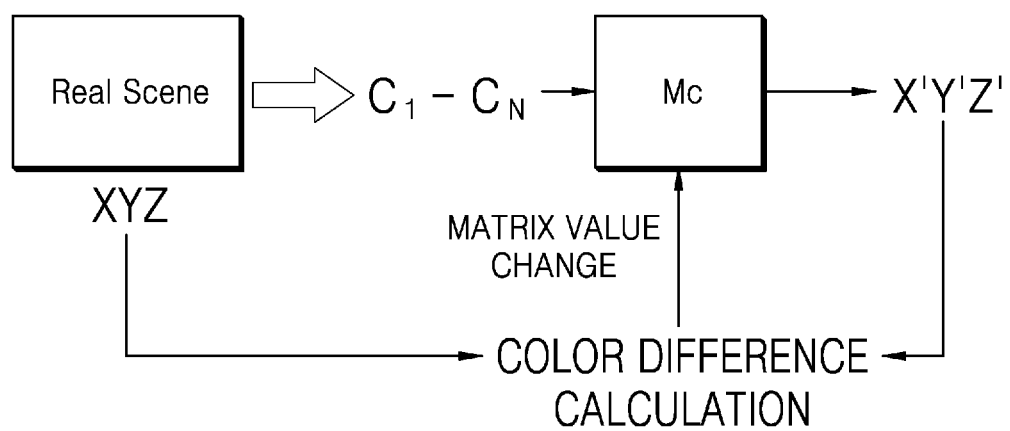
FIG. 8 is a diagram for explaining a process of optimizing a color conversion matrix, according to an embodiment.

FIG. 8 is a diagram for explaining a process of optimizing a color conversion matrix, according to an embodiment.

As a real scene is taken by the multispectral sensor, a plurality of channel signals $C_1$ to $C_N$ may be obtained. When an initial color conversion matrix Mc is applied to the plurality of channel signals $C_1$ to $C_N$, a predicted color value X'Y'Z' may be obtained. By using a formula, such as CIELAB or CIEDE2000, a color difference between an actual color value XYZ corresponding to a real scene and the predicted color value X'Y'Z' may be calculated. To minimize the color difference calculated by using an optimization algorithm, elements of the color conversion matrix Mc may be changed. As the foregoing process is repeated, the color conversion matrix may be optimized to be able to accurately output an actual color value when the channel signals are input.

Referring back to FIG. 3, the color converting portion 240 may perform the color conversion based on the spectrum restoration. For example, as shown in the following Equation 6, the color converting portion 240 may first convert the channel signals into a spectrum signal by using a matrix $M_s$, and then obtain the color value XYZ by applying a matrix CMF generated based on a CIE color matching function.

$$M_C \cdot \begin{bmatrix} C_{1,out} \\ \vdots \\ C_{N,out} \end{bmatrix} = CMF \cdot M_S \cdot \begin{bmatrix} C_{1,out} \\ \vdots \\ C_{N,out} \end{bmatrix} \qquad \text{[Equation 6]}$$

In Equation 6, the matrix CMF may be 3×L. Here, 3 indicates that the matrix CMF has three wavelengths, i.e., X, Y, and Z, and L represents a sampling number for the wavelengths. In Equation 6, the matrix $M_s$ may be L×N.

The matrix $M_s$ may have a relation with a matrix T including spectrum information corresponding to n test colors and a channel signal matrix C measured with respect to the n test color by using the multispectral sensor, according to the following Equation 7.

$$T = M_s C \quad \text{[Equation 7]}$$

Accordingly, the matrix $M_s$ may be calculated by using a pseudo-inverse matrix, as shown in the following Equation 8.

$$M_S = T \cdot PINV(C) = \begin{bmatrix} T_{1,1} & \cdots & T_{1,n} \\ \vdots & \ddots & \vdots \\ T_{L,1} & \cdots & T_{L,n} \end{bmatrix} \cdot PINV \begin{bmatrix} C_{1,1} & \cdots & C_{1,n} \\ \vdots & \ddots & \vdots \\ C_{N,1} & \cdots & C_{N,n} \end{bmatrix} \quad \text{[Equation 8]}$$

N channel signals may be converted into a spectrum signal by the matrix $M_s$. Even though specific values of the spectrum signals are slightly different, the predicted color value may be identical. Accordingly, when the color conversion is performed at a spectrum signal level by using an optimized matrix $M_s$, a more accurate color value may be obtained. The optimization of the matrix $M_s$ may be performed in a similar manner as described with reference to FIG. 8; however, the present disclosure is not limited thereto.

Figure 9:
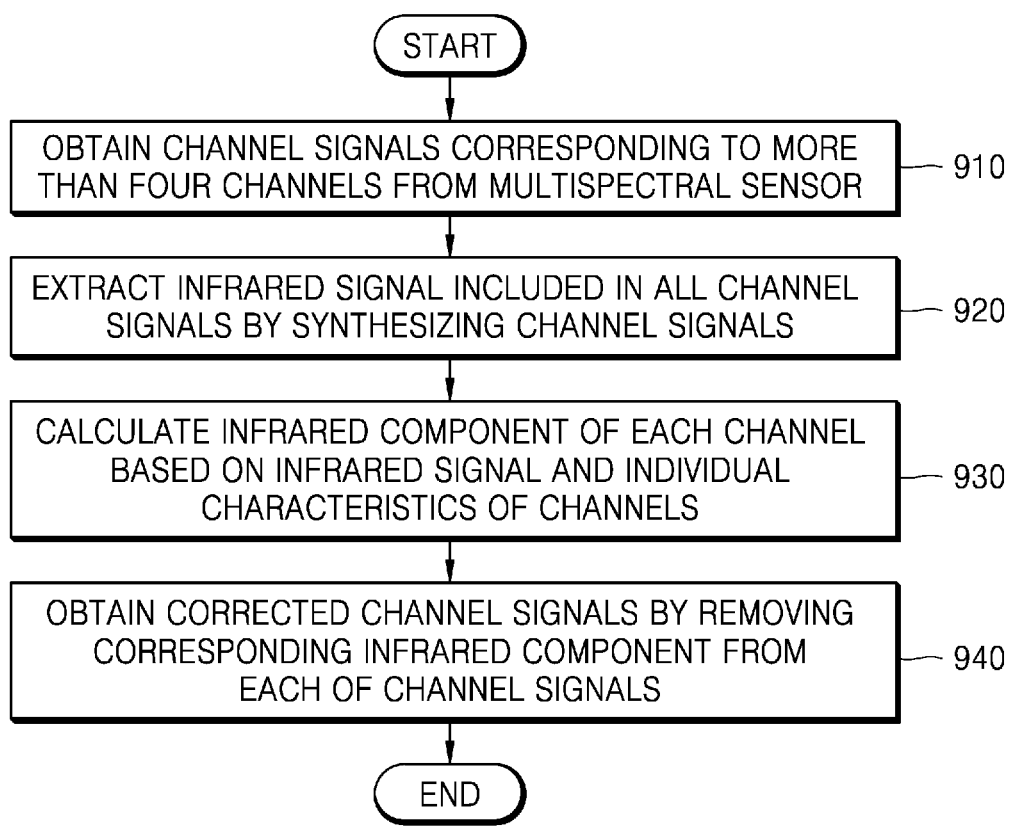
FIG. 9 is a flowchart of a method of acquiring an image, according to an embodiment.

FIG. 9 is a flowchart of a method of acquiring an image, according to an embodiment.

With reference to FIG. 9, a method of acquiring an image, according to the present disclosure, may include operations processed by the image acquisition apparatus 10 of FIGS. 2 and 3. Therefore, even though some descriptions are omitted below, when such descriptions have been provided above in relation to FIGS. 1 to 8, they may be applied to the method of acquiring an image illustrated in FIG. 9.

In operation 910, the image acquisition apparatus may acquire channel signals corresponding to more than four channels from the multispectral sensor. For example, the image acquisition apparatus may select at least some of the channels physically provided at the multispectral sensor and acquire the channel signals from the selected channels. In another example, the image acquisition apparatus may acquire a number of channel signals, which is more or less than a number of channel signals provided at the multispectral sensor, by synthesizing or interpolating channel signals acquired from the channels physically provided at the multispectral sensor.

In operation 920, the image acquisition apparatus may extract an infrared signal included in all channel signals by synthesizing the channel signals. For example, the image acquisition apparatus may generate an infrared signal based on a second-order or higher order of polynomial function including each of the channel signals as a variable. However, the present disclosure is not limited thereto.

In operation 930, the image acquisition apparatus may calculate an infrared component of each channel, based on the infrared signal and individual characteristics of the channels. For example, the image acquisition apparatus may calculate the infrared component of each channel by applying a weight considering the individual characteristics of the channel to the infrared signal. The infrared component of each channel may correspond to a signal intensity increased when a signal of an infrared band is further included, compared to a case where only a signal of a visible ray band is included in each of the channel signals.

The image acquisition apparatus may extract an infrared signal or calculate an infrared component of each channel by using a pre-trained neural network. In other words, the image acquisition apparatus may use a pre-trained neural network in the process of performing at least a part of various operations in operation 920 and operation 930. Accordingly, even in a process which requires a significant amount of calculations or from which a solution is not easily derivable, an intuitive solution may be output by the neural network.

In operation 940, the image acquisition apparatus may obtain corrected channel signals by removing corresponding infrared components from each of the channel signals. The image acquisition apparatus may generate an RGB image by applying a color conversion matrix to the corrected channel signals. Moreover, the image acquisition apparatus may optimize the color conversion matrix so that a color difference between a color value obtained by using the color conversion matrix and an actual color value is minimized. The image acquisition apparatus may generate an image per channel by performing demosaicing on the channel signals, and perform image processing on the image per channel.

In addition, the aforementioned method of acquiring an image may be recorded on a computer-readable recording medium on which one or more programs including instructions to execute the method are recorded. The computer-readable recording medium may include a hardware device specifically configured to store and execute program instructions, such as magnetic media including a hard disk, a floppy disk, and a magnetic tape, optical media, such as a CD-ROM and a DVD, magneto-optical media, such as a floptical disk, ROM, RAM, flash memory, etc. The program instructions may include not only machine language code, which is made by a compiler, but high level language code executable by a computer by using an interpreter, etc.

The image acquisition apparatus (e.g., the image acquisition apparatus 10 of FIGS. 2 and 3) may be employed in a high performance optical device or a high performance electronic device. The electronic device may include, for example, smartphones, mobile phones, cellular phones, personal digital assistants (PDA), laptop computers, personal computers (PCs), various portable devices, home appliances, digital cameras, automobiles, Internet of Things (IoT) devices, and other mobile or no-mobile computing devices, but the disclosure is not limited thereto.

The electronic device may further include, in addition to the image acquisition apparatus 10, a processor configured to control image sensors provided in the electronic device, for example, an application processor (AP), control a number of hardware or software constituent elements by driving operating systems or application programs through the processor, and perform various data processing and calculations. The processor may further include graphics processing units (GPUs) and/or image signal processors. When the processor includes an image signal processor, an image acquired through an image sensor may be stored and/or output using the processor.

Figure 10:
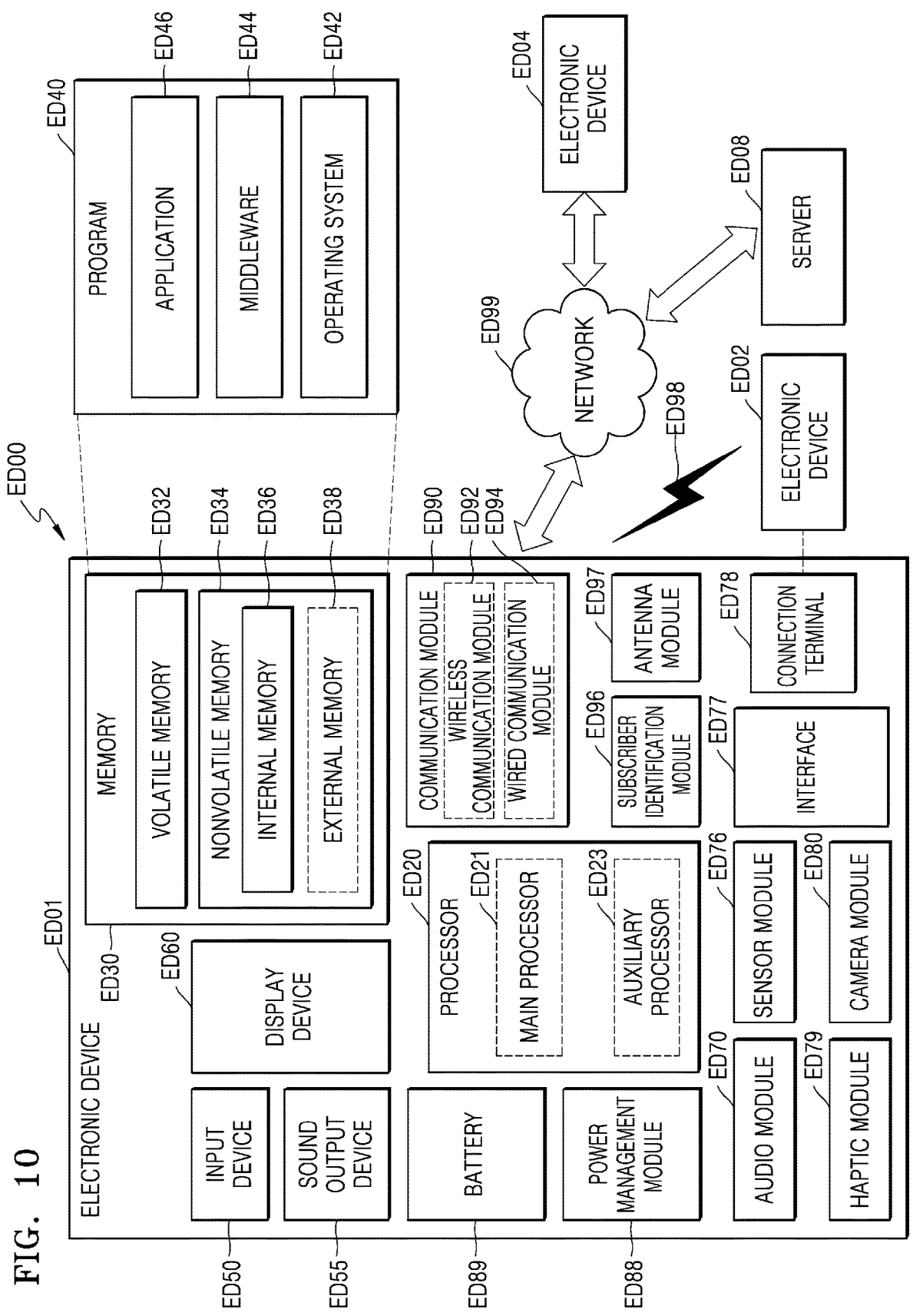
FIG. 10 is a block diagram illustrating components of an electronic device according to an embodiment.

FIG. 10 is a block diagram illustrating components of an electronic device according to an embodiment.

Referring to FIG. 10, in a network environment ED00, an electronic device ED01 may communicate with another electronic device ED02 through a first network ED98 (a short-range wireless communication network and the like), or communicate with another electronic device ED04 and/or a server ED08 through a second network ED99 (a long-range wireless communication network and the like). The electronic device ED01 may communicate with the electronic device ED04 through the server ED08. The electronic device ED01 may include a processor ED20, a memory ED30, an input device ED50, an sound output device ED55, a display device ED60, an audio module ED70, a sensor module ED76, an interface ED77, a haptic module ED79, a camera module ED80, a power management module ED88, a battery ED89, a communication module ED90, a subscriber identification module ED96, and/or an antenna module ED97. In the electronic device ED01, some (the display device ED60 and the like) of constituent elements may be omitted or other constituent elements may be added. Some of the constituent elements may be implemented by one integrated circuit. For example, the sensor module ED76 (a fingerprint sensor, an iris sensor, an illuminance sensor, and the like) may be implemented by being embedded in the display device ED60 (a display and the like).

The processor ED20 may control one or a plurality of other components (hardware and software components, etc.) connected to the processor ED20 by executing software (a program ED40 and the like), and perform various data processing or calculations. As a part of the data processing or calculations, the processor ED20 may load, in a volatile memory ED32, commands and/or data received from other constituent elements (the sensor module ED76, the communication module ED90, and the like), process the command and/or data stored in the volatile memory ED32, and store result data in a non-volatile memory ED34. The processor ED20 may include a main processor ED21 (a central processing unit, an application processor, and the like) and an auxiliary processor ED23 (a graphics processing unit, an image signal processor, a sensor hub processor, a communication processor, and the like) that is operable independently of or together with the main processor ED21. The auxiliary processor ED23 may use less power than the main processor ED21 and may perform a specialized function.

Instead of the main processor ED21 when the main processor ED21 is in an inactive state (sleep state), or with the main processor ED21 when the main processor ED21 is in an active state (an application execution state), the auxiliary processor ED23 may control functions and/or states related to some constituent elements (the display device ED60, the sensor module ED76, the communication module ED90, and the like) of the constituent elements of the electronic device ED01. The auxiliary processor ED23 (an image signal processor, a communication processor, and the like) may be implemented as a part of other functionally related constituent elements (the camera module ED80, the communication module ED90, and the like).

The memory ED30 may store various pieces of data needed by the constituent elements (the processor ED20, the sensor module ED76, and the like) of the electronic device ED01. The data may include, for example, software (the program ED40 and the like) and input data and/or output data about commands related thereto. The memory ED30 may include the volatile memory ED32 and/or the non-volatile memory ED34. The non-volatile memory ED34 may include an internal memory ED36 fixedly installed in the electronic device ED01 and an external memory ED38 that is removable.

The program ED40 may be stored in the memory ED30 as software, and may include an operating system ED42, middleware ED44, and/or an application ED46.

The input device ED50 may receive commands and/or data to be used for constituent elements (the processor ED20 and the like) of the electronic device ED01, from the outside (a user and the like) of the electronic device ED01. The input device ED50 may include a microphone, a mouse, a keyboard, and/or a digital pen (a stylus pen and the like).

The sound output device ED55 may output a sound signal to the outside of the electronic device ED01. The sound output device ED55 may include a speaker and/or a receiver. The speaker may be used for general purposes, such as multimedia playback or recording playback, and the receiver can be used to receive incoming calls. The receiver may be implemented by being coupled as a part of the speaker or by an independent separate device.

The display device ED60 may visually provide information to the outside of the electronic device ED01. The display device ED60 may include a display, a hologram device, or a projector, and a control circuit to control a device. The display device ED60 may include touch circuitry set to detect a touch and/or a sensor circuit (a pressure sensor and the like) set to measure the strength of a force generated by the touch.

The audio module ED70 may convert sound into electrical signals or reversely, electrical signals into sound. The audio module ED70 may obtain sound through the input device ED50 or output sound through a speaker and/or a headphone of another electronic device (the electronic device ED02 and the like) connected to the sound output device ED55 and/or the electronic device ED01 in a wired or wireless manner.

The sensor module ED76 may detect an operation state (power, temperature, and the like) of the electronic device ED01, or an external environment state (a user state, and the like), and generate an electrical signal and/or a data value corresponding to a detected state. The sensor module ED76 may include a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, and/or an illuminance sensor.

The interface ED77 may support one or a plurality of specified protocols used for the electronic device ED01 to be connected to another electronic device (the electronic device ED02 and the like) in a wired or wireless manner. The interface ED77 may include a high definition multimedia interface (HDMI), a universal serial bus (USB) interface, an SD card interface, and/or an audio interface.

A connection terminal ED78 may include a connector for the electronic device ED01 to be physically connected to another electronic device (the electronic device ED02 and the like). The connection terminal ED78 may include an HDMI connector, a USB connector, an SD card connector, and/or an audio connector (a headphone connector and the like).

The haptic module ED79 may convert electrical signals into mechanical stimuli (vibrations, movements, and the like) or electrical stimuli that are perceivable by a user through tactile or motor sensations. The haptic module ED79 may include a motor, a piezoelectric device, and/or an electrical stimulation device.

The camera module ED80 may capture a still image and a video. The camera module ED80 may include the image acquisition apparatus 10, and may also include additional lens assembly image signal processors and/or flashes. The lens assembly included in the camera module ED80 may collect light emitted from a subject for image capturing.

The power management module ED88 may manage power supplied to the electronic device ED01. The power management module ED88 may be implemented as a part of a power management integrated circuit (PMIC).

The battery ED89 may supply power to the constituent elements of the electronic device ED01. The battery ED89 may include non-rechargeable primary cells, rechargeable secondary cells, and/or fuel cells.

The communication module ED90 may establish a wired communication channel and/or a wireless communication channel between the electronic device ED01 and another electronic device (the electronic device ED02, the electronic device ED04, the server ED08, and the like), and support communication through an established communication channel. The communication module ED90 may be operated independent of the processor ED20 (the application processor and the like), and may include one or a plurality of communication processors supporting wired communication and/or wireless communication. The communication module ED90 may include a wireless communication module ED92 (a cellular communication module, a short-range wireless communication module, a global navigation satellite system (GNSS) communication module, and the like), and/or a wired communication module ED94 (a local area network (LAN) communication module, a power line communication module, and the like). Among the above communication modules, a corresponding communication module may communicate with another electronic device through the first network ED98 (a short-range communication network such as Bluetooth, WiFi Direct, or infrared data association (IrDA)) or the second network ED99 (a long-range communication network, such as a cellular network, the Internet, or a computer network (LAN, WAN, and the like)). These various types of communication modules may be integrated into one constituent element (a single chip and the like), or may be implemented as a plurality of separate constituent elements (multiple chips). The wireless communication module ED92 may verify and authenticate the electronic device ED01 in a communication network, such as the first network ED98 and/or the second network ED99, by using subscriber information (an international mobile subscriber identifier (IMSI) and the like) stored in the subscriber identification module ED96.

The antenna module ED97 may transmit signals and/or power to the outside (another electronic device and the like) or receive signals and/or power from the outside. An antenna may include an emitter formed in a conductive pattern on a substrate (a printed circuit board (PCB) and the like). The antenna module ED97 may include one or a plurality of antennas. When the antenna module ED97 includes a plurality of antennas, the communication module ED90 may select, from among the antennas, an appropriate antenna for a communication method used in a communication network, such as the first network ED98 and/or the second network ED99. Signals and/or power may be transmitted or received between the communication module ED90 and another electronic device through the selected antenna. Other parts (an RFIC and the like) than the antenna may be included as a part of the antenna module ED97.

Some of the constituent elements may be connected to each other through a communication method between peripheral devices (a bus, a general purpose input and output (GPIO), a serial peripheral interface (SPI), a mobile industry processor interface (MIPI), and the like) and may mutually exchange signals (commands, data, and the like).

The command or data may be transmitted or received between the electronic device ED01 and the electronic device ED04 through the server ED08 connected to the second network ED99. The electronic devices ED02 and ED04 may be of a type that is the same as or different from the electronic device ED01. All or a part of operations executed in the electronic device ED01 may be executed by one or a plurality of the electronic devices (ED02, ED04, and ED08). For example, when the electronic device ED01 needs to perform a function or service, the electronic device ED01 may request one or a plurality of electronic devices to perform part or all of the function or service, instead of performing the function or service. The one or a plurality of the electronic devices receiving the request may perform an additional function or service related to the request, and transmit a result of the performance to the electronic device ED01. To this end, cloud computing, distributed computing, and/or client-server computing technology may be used.

Figure 11:
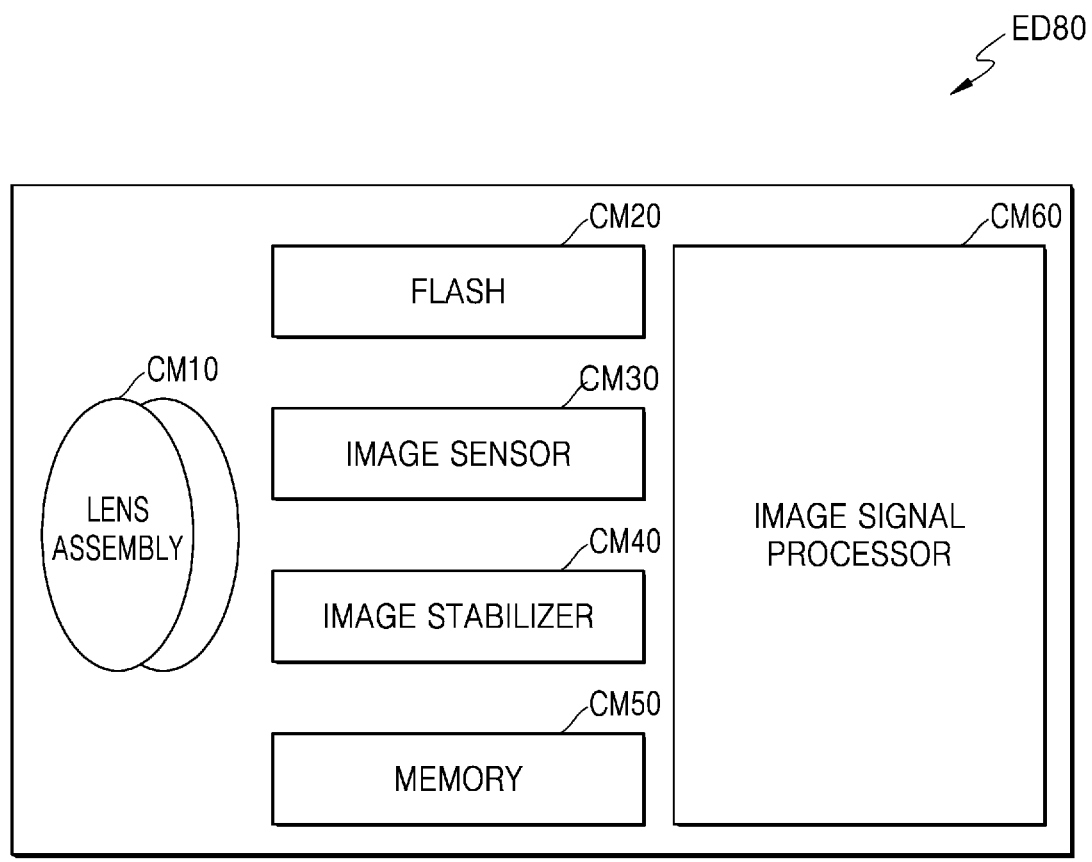
FIG. 11 is a schematic block diagram of a camera module provided in the electronic device of FIG. 10.

FIG. 11 is a schematic block diagram of a camera module provided in the electronic device of FIG. 10.

The camera module ED80 may include the image acquisition apparatus 10 or have a structure obtained by modifying the image acquisition apparatus 10. With reference to FIG. 11, the camera module ED80 may comprise a lens assembly CM10, a flash CM20, an image sensor CM30, an image stabilizer CM40, a memory CM50 (e.g., a buffer memory, etc.), and/or an image signal processor CM60.

The image sensor CM30 may include the image acquisition apparatus 10 or the multispectral sensor 100. The multispectral sensor 100 may obtain an image corresponding to an object by converting light, which has been emitted or reflected from the object and then transmitted via the lens assembly CM10, into electric signals. The multispectral sensor 100 may acquire a hyperspectral image in an ultraviolet to infrared wavelength range, in addition to an RGB image corresponding to the visible ray band.

The image sensor CM30 may further include one or more sensors selected from image sensors having different attributes, such as another RGB sensor, a black and white (BW) sensor, an infrared (IR) sensor, and an ultraviolet sensor, in addition to the multispectral sensor 100. Each sensor comprised in the image sensor CM30 may be implemented as a charged coupled device (CCD) sensor and/or a complementary metal oxide semiconductor (CMOS) sensor.

The lens assembly CM10 may collect light emitted from a subject for image capturing. The camera module ED80 may include a plurality of lens assemblies CM10, and in this case, the camera module ED80 may include a dual camera, a 360 degree camera, or a spherical camera. Some of the lens assemblies CM10 may have the same lens attributes (a viewing angle, a focal length, an auto focus, an F Number, an optical zoom, and the like), or different lens attributes. The lens assembly CM10 may include a wide angle lens or a telescopic lens.

The flash CM20 may emit artificial light to reinforce light emitted or reflected from an object. The flash CM20 may include one or a plurality of light-emitting diodes (a red-green-blue (RGB) LED, a white LED, an infrared LED, an ultraviolet LED, and the like), and/or a xenon lamp.

The image stabilizer CM40 may move, in response to a movement of the camera module ED80 or an electronic device ED01 including the same, one or a plurality of lenses included in the lens assembly CM10 or the image sensor in a particular direction or may compensate for a negative effect due to the movement by controlling (adjusting a read-out timing and the like) the movement characteristics of the image sensor. The image stabilizer CM40 may detect a movement of the camera module ED80 or the electronic device ED01 by using a gyro sensor or an acceleration sensor arranged inside or outside the camera module ED80. The image stabilizer CM40 may be implemented in an optical form.

The memory CM50 may store a part or all data of an image obtained through the multispectral sensor 100 for a subsequent image processing operation. The memory CM50 may be identical to or different from the memory 150 described with reference to FIG. 3. When a plurality of images are obtained at a high speed, only low resolution images are displayed while the obtained original data (Bayer-Patterned data, high resolution data, and the like) is stored in the memory CM50. Then, the memory CM50 may be used to transmit the original data of a selected (user selection, and the like) image to the image signal processor CM60. The memory CM50 may be incorporated into the memory ED30 of the electronic device ED01, or configured to be an independently operated separate memory.

The image signal processor CM60 may perform image processing on the image obtained through the image sensor CM30 or the image data stored in the memory CM50. The image signal processor CM60 may be identical to or different from the processor 200 described with reference to FIGS. 2 and 3. The image processing may include depth map generation, three-dimensional modeling, panorama generation, feature point extraction, image synthesis, and/or image compensation (noise reduction, resolution adjustment, brightness adjustment, blurring, sharpening, softening, and the like). The image signal processor CM60 may perform control (exposure time control, or read-out timing control, and the like) on constituent elements (the image sensor CM30 and the like) included in the camera module ED80. The image processed by the image signal processor CM60 may be stored again in the memory CM50 for additional processing or provided to external constituent elements (the memory ED30, the display device ED60, the electronic device ED02, the electronic device ED04, the server ED08, and the like) of the camera module ED80. The image signal processor CM60 may be incorporated into the processor ED20, or configured to be a separate processor operated independently of the processor ED20. When the image signal processor CM60 is a separate processor from the processor ED20, the image processed by the image signal processor CM60 may undergo additional image processing by the processor ED20 and then displayed on the display device ED60.

The electronic device ED01 may include a plurality of camera modules ED80 having different attributes or functions. In this case, one of the camera modules ED80 may be a wide angle camera, and another may be a telescopic camera. Similarly, one of the camera modules ED80 may be a front side camera, and another may be a rear side camera.

Figure 12A:
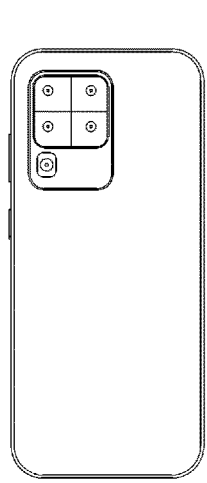
FIGS. 12A-12E and FIGS. 13A-13E are diagrams illustrating various examples of electronic devices to which an image acquisition apparatus according to an embodiment is applied.
Figure 12B:
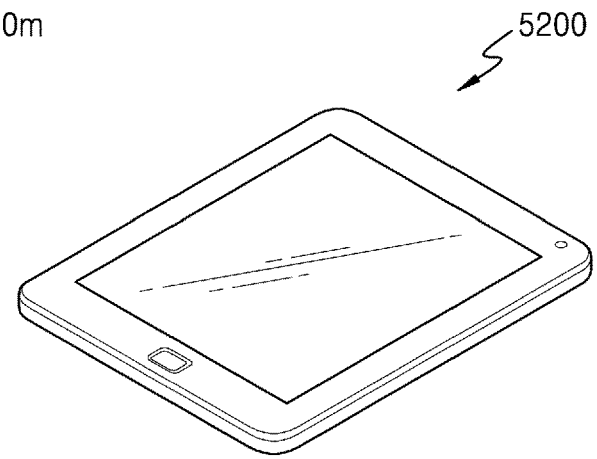
Figure 12C:
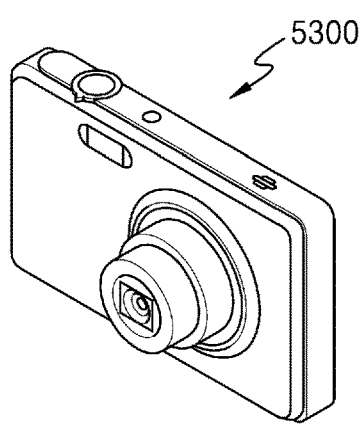
Figure 12D:
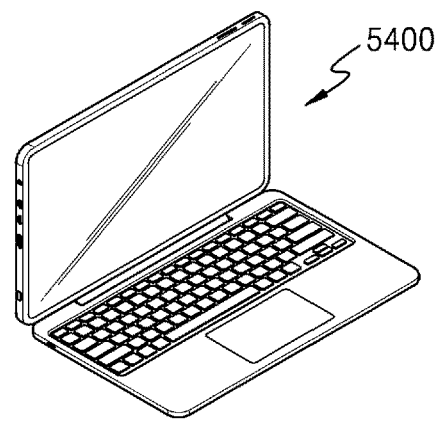
Figure 12E:
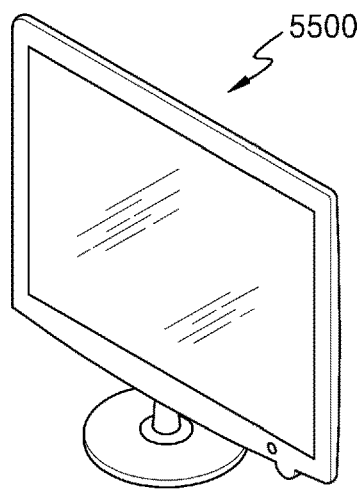

The image acquisition apparatus 10 according to embodiments may be applied to a mobile phone or smartphone 5100m illustrated in FIG. 12A, a tablet or smart tablet 5200 illustrated in FIG. 12B, a digital camera or camcorder 5300 illustrated in FIG. 12C, a notebook computer 5400 illustrated in FIG. 12D, a television or smart television 5500 illustrated in FIG. 12E. One skilled in the art would understand that example embodiments of the image acquisition apparatus may also be used in other applications and configurations. For example, the smartphone 5100m or the smart tablet 5200 may include a plurality of high resolution cameras, each having a high resolution image sensor mounted thereon. Depth information of subjects in an image may be extracted by using high resolution cameras, auto focusing of the image may be adjusted, or subjects in the image may be automatically identified.

Figure 13A:
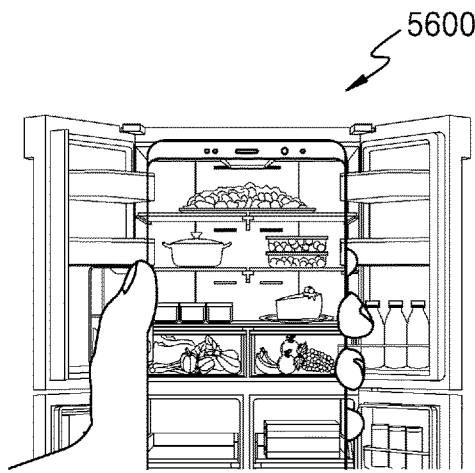
Figure 13B:
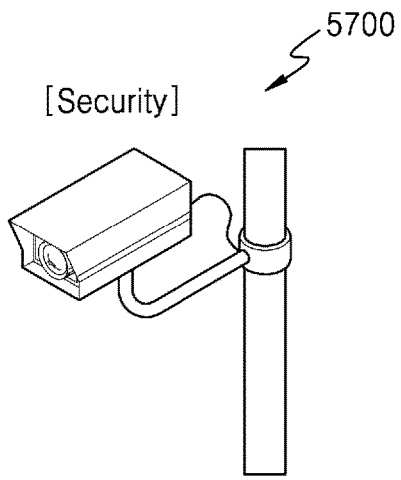
Figure 13C:
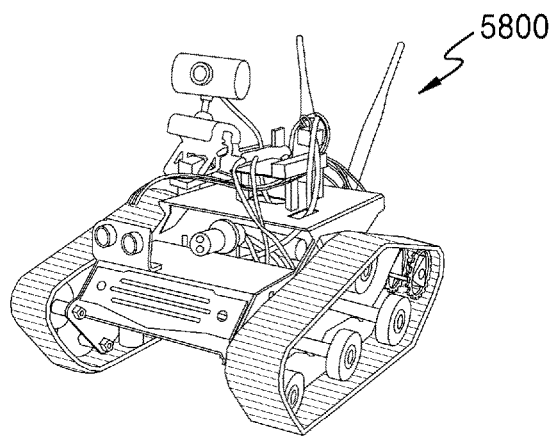
Figure 13D:
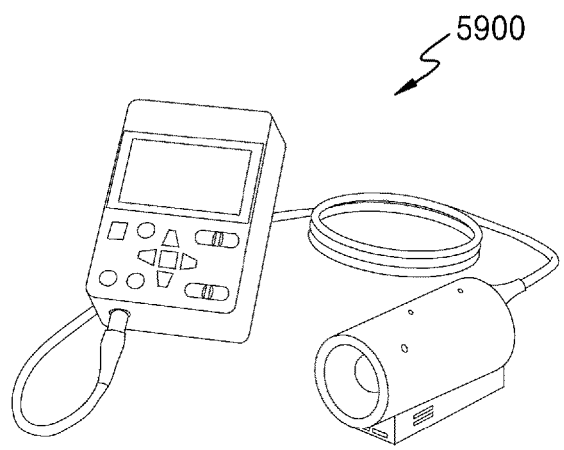

Furthermore, the image acquisition apparatus 10 may be applied to a smart refrigerator 5600 illustrated in FIG. 13A, a security camera 5700 illustrated in FIG. 13B, a robot 5800 illustrated in FIG. 13C, a medical camera 5900 illustrated in FIG. 13D, in addition to other applications and configurations. For example, the smart refrigerator 5600 may automatically recognize food in a refrigerator by using the image acquisition apparatus 10 and notify a user of the presence of a particular food, the type of input or output food and the like, through a smartphone. The security camera 5700 may provide an ultrahigh resolution image and may recognize an object or a person in an image in a dark environment by using high sensitivity. The robot 5800 may be provided in a disaster or industrial site that is not easily or safely accessible by people, and may provide a high resolution image. The medical camera 5900 may provide a high resolution image for diagnosis or surgery, and thus, a field of vision may be dynamically adjusted.

Figure 13E:
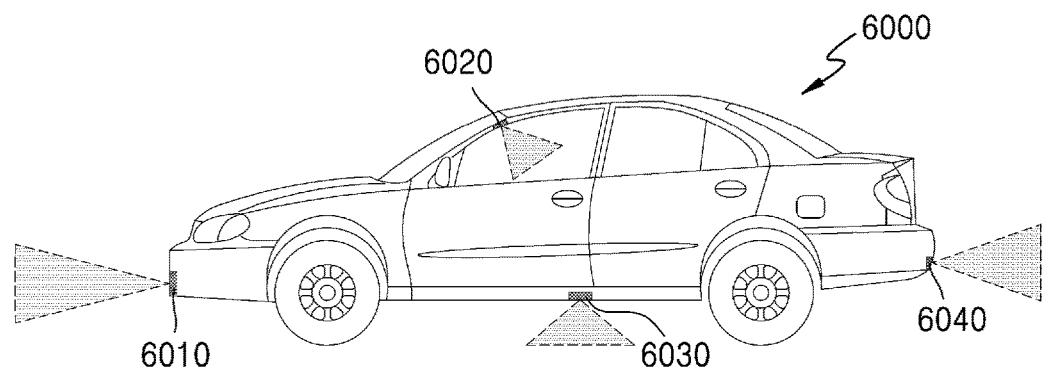

Furthermore, the image acquisition apparatus 10 may be applied to a vehicle 6000, as illustrated in FIG. 13E. The vehicle 6000 may include a plurality of vehicle cameras 6010, 6020, 6030, and 6040 arranged at various positions. Each of the vehicle cameras 6010, 6020, 6030, and 6040 may include the image acquisition apparatus 10 according to an embodiment. The vehicle 6000 may provide a driver with information about the inside or periphery of the vehicle 6000, by using the vehicle cameras 6010, 6020, 6030, and 6040. Accordingly, an object or a person in an image captured by the cameras may be automatically recognized. This information may be used to implement autonomous driving.

While embodiments are described in detail, the scope of rights of the present disclosure is not limited thereto, and various modifications and improvements made by using the fundamental concept of the present disclosure defined in the following scope of claims may also be included in the scope of rights of the present disclosure.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims and their equivalents.

What is claimed is:

1. A method of acquiring an image by using a multispectral sensor, the method comprising:
    acquiring channel signals corresponding respectively to a plurality of channels from the multispectral sensor, wherein the plurality of channels comprises more than four channels;
    determining a cumulative infrared signal included in all of the plurality of channels by synthesizing infrared components of the channel signals acquired from all of the plurality of channels;
    determining an infrared component of each channel of the plurality of channels, based on the cumulative infrared signal and individual characteristics of the channels; and
    acquiring corrected channel signals by removing the infrared component from each of the channel signals of the plurality of channels,
    wherein determining the cumulative infrared signal comprises synthesizing a second-order or higher-order polynomial function corresponding to each of the channel signals as a variable.

2. The method of claim 1, wherein the acquiring of the channel signals comprises selecting more than four channels physically provided at the multispectral sensor and acquiring the channel signals from the selected channels.

3. The method of claim 1, wherein the acquiring of the channel signals comprises synthesizing or interpolating channel signals from four or more channels physically provided at the multispectral sensor to acquire a number of channel signals, which is more or less than the a number of channel signals physically provided at the multispectral sensor.

4. The method of claim 1, wherein determining the infrared component of each channel comprises calculating the infrared component of each channel by applying, to the cumulative infrared signal, a weight considering the individual characteristics of each channel.

5. The method of claim 1, wherein the infrared component of each channel corresponds to a signal intensity increased when a signal of an infrared band is included in each channel of the plurality of channels, compared to a case where only a signal of a visible ray band is included in each channel of the plurality of channels.

6. The method of claim 1, further comprising generating a red-green-blue (RGB) image by applying a color conversion matrix to the corrected channel signals.

7. The method of claim 6, further comprising optimizing the color conversion matrix to minimize a color difference between a color value obtained by using the color conversion matrix and an actual color value.

8. The method of claim 1, wherein determining the cumulative infrared signal or determining the infrared component of each channel is determined by using a pre-trained neural network.

9. The method of claim 1, further comprising:
generating an image per channel by performing demosaicing on the channel signals; and
performing image processing on the image per channel.

10. An image acquisition apparatus comprising:
a multispectral sensor; and
a processor, the processor being configured to
acquire channel signals corresponding respectively to a plurality of channels from the multispectral sensor, wherein the plurality of channels comprises more than four channels,
determine a cumulative infrared signal included in all of the plurality of channels by synthesizing infrared components of the channel signals acquired from the plurality of channels,
determine an infrared component of each channel of the plurality of channels, based on the cumulative infrared signal and individual characteristics of the channels, and
acquire corrected channel signals by removing the infrared component from each of the channel signals of the plurality of channels,
wherein the processor is configured to determine the cumulative infrared signal by synthesizing a second-order or higher-order polynomial function corresponding to each of the channel signals as a variable.

11. The image acquisition apparatus of claim 10, wherein the processor is configured to select more than four channels physically provided at the multispectral sensor and acquire the channel signals from the selected channels.

12. The image acquisition apparatus of claim 10, wherein the processor is configured to acquire the channel signals by synthesizing or interpolating channel signals acquired from four or more channels physically provided at the multispectral sensor to acquire a number of channel signals, which is more or less than a number channels physically provided at the multi\spectral sensor.

13. The image acquisition apparatus of claim 10, wherein the processor is configured to determine the infrared component of each channel by applying, to the cumulative infrared signal, a weight considering the individual characteristics of each channel.

14. The image acquisition apparatus of claim 10, wherein the infrared component of each channel corresponds to a signal intensity increased when a signal of an infrared band is included in each channel of the plurality of channels, compared to a case where only a signal of a visible ray band is included in each channel of the plurality of channels.

15. The image acquisition apparatus of claim 10, wherein the processor is configured to generate a red-green-blue (RGB) image by applying a color conversion matrix to the corrected channel signals.

16. The image acquisition apparatus of claim 15, wherein the processor is configured to optimize the color conversion matrix to minimize a color difference between a color value obtained by using the color conversion matrix and an actual color value.

17. The image acquisition apparatus of claim 10, wherein the processor is configured to determine the cumulative infrared signal or determine the infrared component of each channel by using a pre-trained neural network.

18. The image acquisition apparatus of claim 10, wherein the multispectral sensor comprises:
a photodiode;
a spectral filter integrated on the photodiode; and
a driver circuit configured to drive the photodiode.

* * * * *